May 2, 1961 J. T. COCHRAN ET AL 2,982,214
ELECTROMAGNETIC PUMP
Filed June 19, 1957
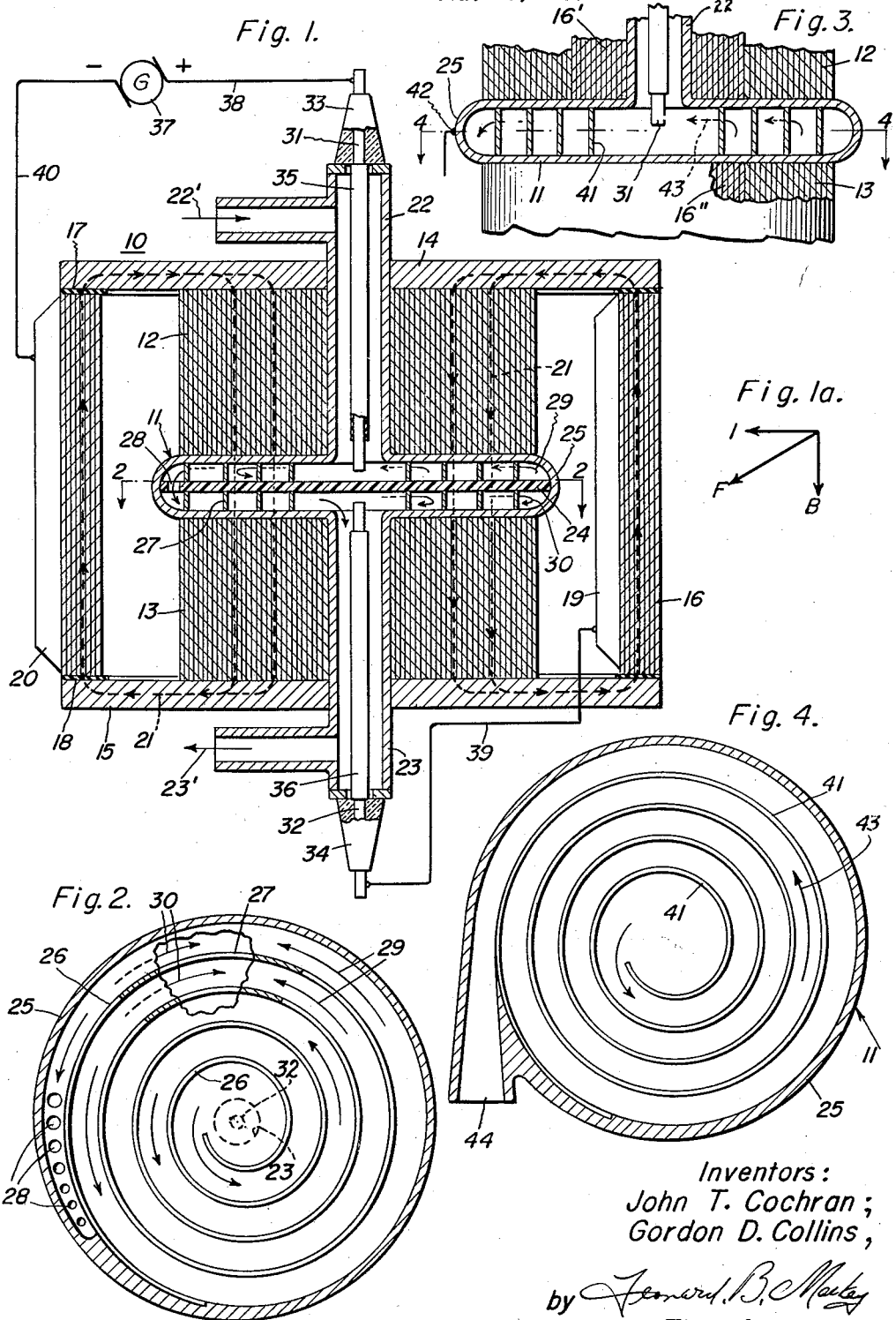
Inventors:
John T. Cochran;
Gordon D. Collins,
by Leonard B. Mackay
Their Attorney.

United States Patent Office 2,982,214
Patented May 2, 1961

2,982,214
ELECTROMAGNETIC PUMP

John T. Cochran and Gordon D. Collins, San Jose, Calif., assignors to General Electric Company, a corporation of New York Filed June 19, 1957, Ser. No. 666,568

5 Claims. (Cl. 103—1)

This invention relates to electromagnetic pumps for pumping electrically conductive fluids of the type wherein pumping action is effected by direct interaction of magnetic flux and electrical current passing through the electrically conductive fluid to be pumped.

It is well recognized that mutually perpendicular electrical current flow I and magnetic flux B passing through a conducting medium result in a force F, being exerted on the conducting medium, which is perpendicular to the direction of current flow and magnetic flux. This is the well known motor action.

Electromagnetic pumps have been devised wherein a single duct is oriented between the pole pieces of a magnet and current is caused to pass through the duct walls and conductive fluid therein in a direction perpendicular to the magnetic flux due to the magnet. This causes a force to be exerted on the fluid so that pumping action takes place. Such pumps have no moving parts and are suited for applications where leakage, such as that which occurs in conventional pumps from shaft seals, cannot be tolerated.

The magnetic field associated with a current carrying conductor causes a shift in the magnetic field in an upstream direction toward the pump or duct inlet. Also, the flow of conductive fluid, acting as a conductor, tends to concentrate the current in a downstream direction toward the pump outlet. This further distorts the interacting magnetic flux and electrical current from the desired uniform distribution. This effect is known as armature reaction and results in pump inefficiency. Also, the pressure obtainable with such a single pass pump is limited.

In order to improve pumping efficiency and obtain high pressure, centrifugal pumps have been devised. Such electromagnetic pumps utilize a disk-shaped chamber having magnetic flux passing through the chamber in a direction substantially perpendicular to the plane of the disk-shaped chamber and electric current flowing through the conductive fluid in a radial direction from the center of the chamber to the periphery of the chamber wherein the conductive fluid enters the center of the chamber and spins outwardly to the periphery of the chamber. If the magnetic field is uniform, armature reaction due to the tangential motion of the fluid is minimized. However, armature reaction due to radial motion of the fluid is still present.

The dynamic or velocity head imparted to the conductive fluid in such a centrifugal pump is produced by centrifugal force. Therefore, to produce high pressure by conversion from high velocity to high pressure, a relatively large radius chamber and high fluid rotational velocity and flow rate are required. High rotational velocity results in power loss in overcoming the friction of high velocity fluid flow along the walls of the pump chamber. Also, the large radius pump chamber necessitates inefficient use of materials.

Accordingly, it is particularly desirable that an electromagnetic pump be provided which is relatively compact and provides the high discharge pressure available with centrifugal pumps but at higher efficiency than obtainable with previously available pumps. In accordance with the practice of this invention, these desirable characteristics are obtained with a multipass electromagnetic pump of improved design.

Therefore, an object of this invention is to provide a high efficiency multipass electromagnetic pump of improved design for pumping electrically conductive fluids.

Another object of this invention is to provide an improved electromagnetic pump for electrically conductive fluids for efficiently producing high pressure output at a low flow rate.

In accordance with the practice of this invention, an electromagnetic pump includes a pump inlet and outlet communicating with a chamber. Electric current passes through electrically conductive fluid in the chamber and magnetic flux passes through the chamber perpendicular to the direction electric current passes through the conductive fluid. Means are provided within the chamber defining a fluid flow path progressing in a radial direction. This provides a highly efficient pump capable of high output pressure at a low flow rate.

Other objects and important aspects of this invention will become apparent from the specification and claims when read with the drawings wherein:

Figure 1 illustrates an embodiment of an electromagnetic pump incorporating the practice of this invention, Figure 1(a) is a diagram used to explain the operation of electromagnetic pumps, Figure 2 illustrates a portion of the pump illustrated in Figure 1 through partial section 2—2, and Figures 3 and 4 illustrate another embodiment of an electromagnetic pump in accordance with this invention.

Figure 1 illustrates in cross section an electromagnetic pump comprising magnetic core structure 10 and disk-shaped chamber 11. Magnetic core structure 10 includes upper pole piece 12 and lower pole piece 13 attached to upper and lower circular plates 14 and 15, respectively, all of which are fabricated from suitable magnetic material, such as soft iron. Pole pieces 12 and 13 support the flat walls of chamber 11 and carry the force of the internal pump pressure thereby eliminating the need for heavy stiffening members on chamber 11.

Coil 16 of spirally wound sheet magnetic material having a suitable insulating coating on each surface thereof is oriented between and insulated from end plates 14 and 15 by insulating spacers 17 and 18. Tabs 19 and 20 on coil 16 provide access for electrical connections so that magnetizing current can be passed through coil 16. Thus, coil 16 permits flow of magnetizing current and completes the magnetic circuit, consisting of coil 16, plate 14, pole pieces 12 and 13, and plate 15. The direction of magnetic flux through the magnetic circuit and chamber 11 is indicated by dashed arrows 21.

Pump chamber 11 communicates with pump inlet assembly 22 and pump outlet assembly 23. Electrically non-conductive partition 24 of insulating material is secured to the arcuate peripheral wall 25 of chamber 11. Spirally wound electrically conductive fins 26 and 27 are bonded to chamber 11 and partition 24 and form with the walls of chamber 11 a spiral fluid flow path progressing in a radial direction.

Referring now to Figure 2, which illustrates section 2—2 through the pump chamber 11, the fluid flow path will become apparent. Upper fin 26 defines a counterclockwise spiral fluid flow path progressing in an outward radial direction to the peripheral wall 25 of chamber 11. Fin 26 approaches the arcuate peripheral wall 25 of chamber 11 so as to define a region of decreasing cross section. Holes 28 in non-conductive partition 24 permit the electrically conductive fluid being pumped to pass to the lower half of the pump chamber to spiral inwardly in a clockwise direction to the central region of chamber 11. Alternatively, a small gap between partition 24 and wall 25 in the vicinity of the end of the upper fluid flow path can be provided to permit fluid flow from the upper side to the lower side of partition 24. The direction of electrically conductive fluid flow above and below partition 24 is designated by arrows 29 and 30, respectively.

Referring again to Figure 1, there are illustrated electrodes 31 and 32 supported by insulators 33 and 34, respectively, which are attached to the inlet and outlet structures 22 and 23, respectively. The electrodes are provided with electrically non-conductive coatings 35 and 36 or by coatings which are not wet by the conductive fluid being pumped. The coatings extend over the entire length of the electrodes except for the short portion of each electrode which projects into the central region of pump chamber 11. Electric power providing the magnetic flux and the electric current flow through the electrically conductive fluid to be pumped is provided by any suitable source such as direct current power source 37. Leads 38, 39, and 40 complete the series circuit from power source 37 through electrode 31, the electrically conductive fluid being pumped, electrode 32, coil 16, and back to power source 37 through lead 40.

In operation, electrically conductive fluid fills the pump from inlet 22 to outlet 23. Electric current flows from the uninsulated end portion of electrode 31 into the electrically conductive fluid being pumped and flows radially outward through the conductive fluid and through the narrow dimension of conductive fin 26 on the upper side of partition 24 to the periphery of chamber 11 and then flows radially inwardly through the electrically conductive fluid and through the narrow dimension of conductive fin 27 to the uninsulated end portion of electrode 32.

The relationship of magnetic field B, electric current I, and the force F exerted on the conductive fluid, in the upper left hand portion of the cross section of the pump illustrated in Figure 1, is readily apparent when reference is made to the diagrammatic illustration of Figure 1(a). The magnetic field, current, and the resulting force on the conductive fluid are mutually perpendicular in accordance with what is customarily referred to as the left hand motor rule. That is, the interaction of electric current and magnetic flux exerts a force on the electrically conductive fluid in a direction out of the surface of the paper as illustrated in Figure 1 by arrow 29 and vector F in Figure 1(a). Thus, due to the interaction of the electric current and magnetic flux, electrically conductive fluid introduced through inlet assembly 22, as indicated by arrow 22', flows spirally outward in a counterclockwise direction, looking at the top of the pump, to the periphery of chamber 11 where pressure increases and velocity decreases as fluid flows through holes 28. Conductive fluid then flows spirally inward in a clockwise direction on the lower side of partition 24 leaving through outlet assembly 23 as indicated by arrow 23'.

The desirable characteristics of electromagnetic pumps incorporating this invention will be readily apparent from the following tabulation comparing an electromagnetic pump incorporating the practice of this invention with a typical prior art centrifugal electromagnetic pump.

| Characteristics | Pump Incorporating This Invention | Prior Art |
| --- | --- | --- |
| Dimensions | 12 inches diameter by 13 inches high. | 15 inches diameter by 12 inches high. |
| Fluid Flow Rate | 18.7 gallons per minute. | 18.7 gallons per minute. |
| Output Pressure | 110 pounds per square inch. | 110 pounds per square inch. |
| Power Consumption | 2,480 watts | 5,600 watts. |
| Efficiency: $\left[\frac{\text{Fluid Power Output}}{\text{Electrical Power Input}}\right]$ | 36% | 16%. |

It will be observed that the combined coil and magnetic core member 16 effects a substantially uniform and symmetrical magnetic flux through the disk-shaped chamber 11, thereby minimizing armature reaction due to the tangential component of conductive fluid flow. Fins 26 and 27 form an extended pump channel wherein pumping action occurs along the entire length of the channel. Therefore, high rotational velocity is not necessary for high pressure as in conventional centrifugal electromagnetic pumps. The resulting low fluid flow rate reduces frictional losses and further minimizes armature reaction. Therefore, relatively high pressure at a relatively low flow rate is obtainable.

Also, the long relatively narrow fluid flow path defined by fins 26 and 27 reduces the radial component of fluid flow in any discrete region of the path, thereby further minimizing armature reaction and improving pump efficiency. Compactness and efficiency also are achieved by forming the fluid flow path in spiral form and effecting flow in a first direction on one side of partition 24 and the opposite direction on the opposite side of partition 24. The oppositely directed radial flow camponents on either side of partition 24 substantially eliminate armature reaction due to radial motion of the fluid.

The electrical and over-all efficiency of the pump is improved over that obtainable with conventional electromagnetic pumps since the multipass feature of the pump of this invention results in relatively high pressure output with a relatively low current density through the fluid being pumped. That is, in conventional electromagnetic pumps, high current densities are required in order to obtain high pressure output. Since the heat produced in the fluid is proportional to the square of the current passing through the fluid, high current density often results in severe overheating and sometimes boiling of the fluid being pumped with resulting losses in efficiency.

In addition, with the pump of this invention, high pressures can be developed with a high voltage to current ratio so that, with respect to direct current pumps, the efficiency of the rectifier supplying the direct current is enhanced.

Also, in the pump of this invention, the current passes from the submerged electrode into the electrically conductive fluid being pumped and then across the fins without passing through the walls of the pump chamber as is the case with previously available pumps. Thus, the pump of this invention makes advantageous use of the characteristic contact resistance which exists between some liquid metals and some solid metals. That is, the contact resistance minimizes current flow in the pump chamber walls of the pump of this invention, thereby increasing pumping efficiency whereas contact resistance tends to decrease the efficiency of previously available electromagnetic pumps since current in these pumps enters the fluid through the pump chamber walls.

As previously mentioned, the magnetic core of the pump may be constructed of any satisfactory magnetic material, such as soft iron, and may be energized by means other than combined core and coil. For example, a permanent magnet may be used to provide magnetic flux for a pump operating on direct current. Although this specific example of the pump is illustrated as operating on direct current, it will be readily apparent that with the laminated core the pump of this invention may be operated on alternating current. Also, the conductive fluid circuit and the magnetic circuit may be connected in parallel rather than in series as illustrated in the specific example in Figure 1.

It is desirable that the walls of chamber 11 and the conductive fins, across which current must flow but along which minimum current flow is desired, be as thin as possible consistent with necessary structural strength. Chamber 11 and the associated inlet and outlet assembly may be fabricated from electrically non-conductive material or from any conductive material having a sufficiently high electrical resistance with respect to the resistance of the conductive fluid to be pumped.

For example, chamber 11 including the inlet and outlet assemblies might be fabricated from stainless steel or nickel alloys having a resistivity of approximately 40 to 50 microhm-inches. This resistivity is sufficiently high compared to the resistivity of a liquid metal, such as sodium, having a resistivity of approximately 10 microhm-inches, that minimum current leakage through the walls of chamber 11 will occur and effective pumping action may be obtained. Fins 26 and 27 may be fabricated of thin sheet material, such as stainless steel.

Figures 3 and 4 illustrate another embodiment of the practice of this invention wherein electrically conductive fluid is pumped in a spiral path from the region of the center of the pump chamber to the periphery thereof and is discharged. Thus, the pump illustrated in Figures 3 and 4 incorporates the multipass feature but does not incorporate the reverse flow feature of the pump illustrated in Figure 1.

Features illustrated in Figures 3 and 4 which correspond to those illustrated in Figure 1 are identified by the same reference numerals. In order to simplify the illustration and description of the embodiment shown in Figures 3 and 4, the complete magnetic and electric power circuits have not been illustrated. However, additional electrically energized coils 16' and 16", connected in series with coil 16, are partially illustrated. These coils produce a tapering of the magnetic flux field so that the flux is greatest in the center and decreases toward the periphery of the chamber 11. This tapered magnetic field effectively compensates for armature reaction resulting from the radial velocity of the fluid being pumped.

However, it will be apparent that a magnetic circuit of the type illustrated and described in Figure 1 may be utilized to provide the magnetic flux necessary for the operation of the pump illustrated in Figure 3.

Also it will be appreciated that fluid may enter the bottom of the pump illustrated in Figures 3 and 4 while current carrying conductor 31 enters the top of the pump.

In this embodiment, chamber 11 is fabricated from electrically conductive material or, if fabricated of electrically non-conductive material, the peripheral wall 25 must be electrically conductive so that current flow from electrode 31 through electrically conductive fluid in the pump and radially across conductive fin 41 can be taken through tap 42 at the periphery of the pump.

As may be seen by viewing Figures 3 and 4, electrically conductive fluid enters through pump input assembly 22 and flows outwardly due to interaction of the electric current and magnetic flux thereon in a counter-clockwise direction, as indicated by arrows 43, through the fluid flow path defined by fin 41 and chamber 11 to the periphery of the chamber where conductive fluid is extracted through outlet 44. The cross section of the fluid flow path increases in the vicinity of outlet 44 to effect partial conversion of the fluid velocity head to a pressure head.

In view of the foregoing, it will be apparent that this invention provides an improved high efficiency electromagnetic pump providing high pressure output at low flow rates. This pump is ideally suited for pumping electrically conductive fluids such as liquid metals like sodium, mercury, and bismuth, and for pumping fluids having electrically conductive materials in solution or suspended therein.

While this invention has been described in connection with specific embodiments, it is apparent that it is subject to many modifications and variations. Accordingly, it is intended in the appended claims to cover all modifications and variations that come within the true spirit and scope of this invention.

What is claimed is:

1. An electromagnetic pump for electrically conductive fluids which comprises a disc-shaped chamber provided with an inlet conduit opening at the center and an outlet conduit opening from the periphery of said chamber, at least one conductive fin supported within said chamber defining a spiral fluid flow path progressing outwardly from a point adjacent said inlet at the center to a point adjacent the outlet at the periphery of said chamber, a first electrical terminal oriented to make connection with conductive fluid adjacent said inlet and a second electrical terminal oriented to make connection with conductive fluid at said periphery to pass electric current radially through said conductive fluid and conductive fin in said chamber, a magnetic core structure including two pole pieces located on opposite sides of said chamber, a coil wound around said core structure and additional coils disposed centrally within said pole pieces, said coils being connected in series with one another, said coils and core structure being adapted to produce a magnetic flux perpendicular to the plane of said chamber and which flux is greatest in the center and decreases toward the periphery of said chamber.

2. An electromagnetic pump according to claim 1 wherein said coils comprise spirally wound sheet of magnetic material having an insulating coating on the surface.

3. An electromagnetic pump according to claim 1 in combination with power source means connected to pass an electric current in series through said coils and radially through said chamber to produce said magnetic flux and cause conductive fluid introduced at said inlet conduit to spiral outwardly toward the periphery of said chamber and said outlet conduit.

4. An electromagnetic pump according to claim 1 wherein said inlet conduit opens centrally through one of said pole pieces into said chamber, said first electrical terminal being in the form of an elongated electrode extending coaxially through said inlet conduit and provided with a non-conductive coating not wet by said conductive fluid and which covers all but the end of said electrode adjacent the center of said chamber.

5. An electromagnetic pump for electrically conductive fluids which comprises a disc-shaped chamber provided with an inlet conduit opening at the center on one side and an outlet conduit opening from the center on the other side of said chamber, a non-conductive flat partition member, at least one conductive fin disposed within said chamber on each side of said partition to support said partition and to define therewith and with the walls of said chamber a fluid flow path spiralling outwardly from said inlet conduit to the periphery of said chamber on one side of said partition and spiralling inwardly from said periphery to said fluid outlet on the other side of said partition, a first electrical terminal oriented to make connection with conductive fluid adjacent said inlet and a second electrical terminal oriented to make connection with conductive fluid adjacent said outlet to pass electric current radially through said conductive fluid and said conductive fins on each side of said partition, a magnetic core structure including two pole pieces located on opposite sides of said chamber, and a coil wound around said core structure and forming part of the magnetic circuit and connected in series with the terminal means and adapted to produce a magnetic flux perpendicular to the plane of said chamber and the directions of current flow through said conductive liquid therein, whereby conductive fluid introduced at said inlet conduit is caused to spiral outwardly on one side of said partition to the periphery thereof and then is caused to spiral inwardly on the other side of said partition through said flow path to be discharged from said chamber through said outlet conduit, said inlet and outlet conduits opening centrally through said pole pieces into said chamber, said first and second electrical terminals being in the form of elongated electrodes extending coaxially through said inlet and outlet conduits respectively, said first and second electrical terminals being further provided with a non-conductive coating not wet by said conductive fluid and which covers all but the end of said electrode adjacent said partition.

References Cited in the file of this patent

UNITED STATES PATENTS

| | | |
|---|---|---|
| 2,652,778 | Crever | Sept. 22, 1953 |
| 2,655,107 | Godbold | Oct. 13, 1953 |
| 2,669,931 | Godbold | Feb. 23, 1954 |
| 2,716,943 | Vandenberg | Sept. 6, 1955 |
| 2,741,984 | Lindenblad | Apr. 17, 1956 |
| 2,811,107 | Brill | Oct. 29, 1957 |
| 2,847,936 | Richter | Aug. 19, 1958 |

FOREIGN PATENTS

| | | |
|---|---|---|
| 239,816 | Switzerland | Mar. 1, 1946 |
| 528,091 | Great Britain | Oct. 22, 1940 |